Nov. 18, 1941.  E. F. WICHOREK ET AL  2,263,113
RESILIENT COUPLING ASSEMBLY
Filed Nov. 24, 1939
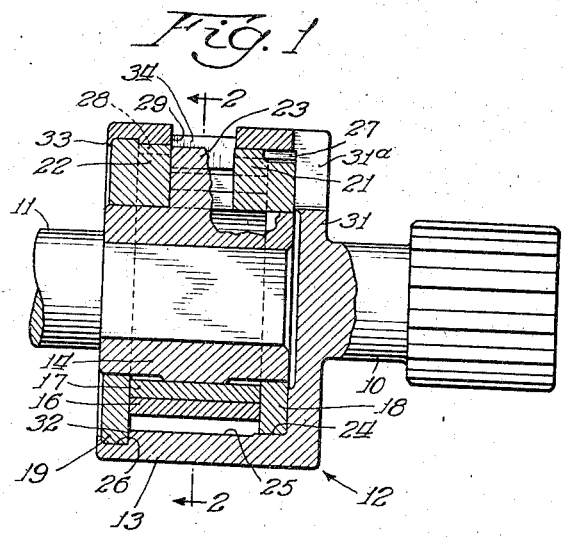
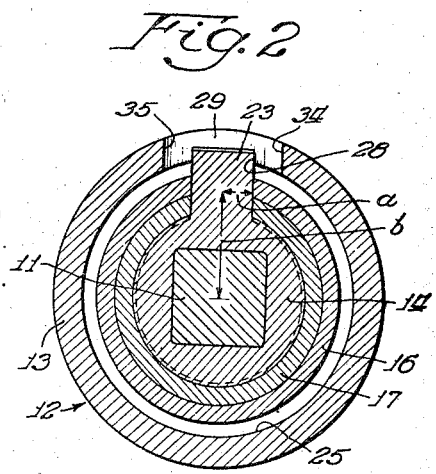
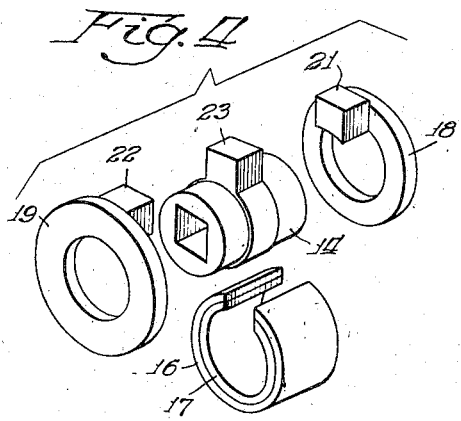
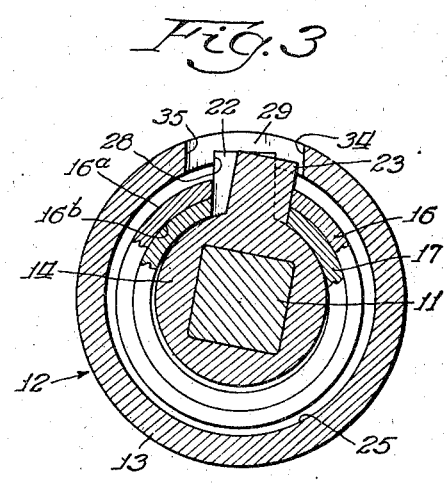
Inventors:
Edmund F. Wichorek
John Kanuch
By Edward C. Gritzbaugh
Atty.

Patented Nov. 18, 1941

2,263,113

UNITED STATES PATENT OFFICE 2,263,113

RESILIENT COUPLING ASSEMBLY

Edmund F. Wichorek and John Kanuch, Cleveland, Ohio, assignors to Pump Engineering Service Corporation, Cleveland, Ohio, a corporation of Ohio Application November 24, 1939, Serial No. 305,828

5 Claims. (Cl. 64—27)

This invention relates to resilient shaft couplings and particularly to couplings of this type having improved torsion vibration dampening characteristics.

It is an object of the present invention to provide an improved arrangement for drivingly connecting one shaft with another shaft through a resilient medium permitting of limited relative arcuate movement between said shafts and particularly wherein there is provided a novel relationship of elements for loading said resilient medium in a manner to effect an optimum distribution of stresses therein.

More specifically it is an object to provide in a resilient coupling including a circular resilient split steel ring as the resilient medium, an improved arrangement for loading said spring ring by spreading the adjacent ends thereof apart whereby to effect an optimum distribution of the stresses therein.

A still further and more detailed object is the provision of an improved arrangement for limiting the relative arcuate movement between the two shafts.

Another specific object is the provision of an improved arrangement of thrust lugs for engaging the open ends of the spring ring, these lugs being carried upon readily removable mounting members at least one of which also serves as a closure member.

Still another object is the provision of an improved housing construction adapted for cooperation with the improved thrust lugs and supporting member.

Another important object in the present invention is the provision of an improved bearing relation between the relatively arcuately adjustable members which functions in combination with the resilient split ring to effect a dampening action opposing abnormal amplitudes of vibration at resonant frequency.

Still another specific object is an improved arrangement including a plurality of nested concentric split ring members.

Other and more specific objects advantages and uses of my invention will appear from the following detailed description taken in connection with the appended drawing forming a part thereof and wherein:

Figure 1 is an axial cross-section of a preferred embodiment;

Figure 2 is a transverse cross-section taken substantially on the line 2—2 of Figure 1;

Figure 3 is a view corresponding to Figure 2 but showing the parts in the position occupied when the spring has been loaded by relative arcuate movement between the two shafts; and Figure 4 is an exploded view with certain parts including the housing omitted and showing to advantage the interior construction.

Referring in greater detail to the figures of the drawing a pair of aligned shafts 10 and 11 are resiliently connected in driving relation by means of a resilient coupling indicated generally at 12. This coupling comprises generally a cylindrical hollow housing 13 drivingly related to a coaxial centrally disposed hub 14 through the medium of a plurality of resilient split spring steel rings 16 and 17 hub 14 being fixed on shaft 11 as by a non-circular socket. This driving relation is effected by means of a pair of plates 18 and 19 non-rotatably received within housing 13 on opposite sides of spring ring members 16 and 17 and carrying axially inwardly extending torque thrust lugs 21 and 22 projecting between the open ends of the split spring rings and cooperating with a radially outwardly extending torque thrust lug 23 carried on hub member 14 positioned between the ends of the spring rings. It will be apparent that opposite relative arcuate movement between the housing 13 and the hub 14 will cause protuberances 21 and 22 to move in one direction and the protuberance 23 to move in the opposite direction thus effecting the spreading apart of the open ends of the spring rings, loading these springs and tending to cause shafts 10 and 11 to rotate in the same direction.

While housing 13 has been shown as an integral enlargement on the end of shaft 10, and this arrangement is contemplated since it affords certain important advantages from a fabrication and operation point of view, it will nevertheless be apparent that housing 13 can be made a separate element arranged to be connected to shaft 10 in a manner similar to the non-rotative relation indicated between hub 14 and shaft 11. Similarly, hub 14 may be formed as an integral part of shaft 11, although we prefer the arrangement as shown, since it likewise has certain manufacturing and operating advantages.

With more specific reference to the detailed construction of housing 13, we prefer to form the same with a plurality of bores 24, 25 and 26 of increasing size progressing from the inner end of the cylindrical housing outwardly. Aligned coaxial interior splines or keyways 27 and 28 communicate with the mid-portion of transverse elongated slot 29, or opening 29 through the wall of the housing, this opening having an important function to be described. Thrust plate 18 is received within cylindrical bore 24 with the outer portion of thrust lug 21 extending beyond ring 18 being received in spline or keyway 27, thus locking ring 18 against relative arcuate movement with respect to housing 13 and presenting lug 21 for cooperation with the ends of the spring rings. For the purpose of facilitating the fabrication of keyways or splines 27 and 28 and for the further purpose of providing access to the rear wall of cylindrical housing 13 to facilitate disassembly, there is provided an orifice 31a in the rear wall 31 of housing 12 in communication with the rear of thrust plate 18 and spline 27. Slightly enlarged bore 25 serves two important functions. First, by enlarging this portion of the housing the installation of plate 18 in bore 24 is made easier. Ring 18 is given a pressed fit within bore 24 and by virtue of the slight enlargement of bore 25, the ring can be moved through this portion of the bore without difficulty. Secondly, the enlarged bore 25 provides additional area for the free expansion of the rings 15 and 17 as will appear. The enlarged bore 26 serves to receive thrust plate 19 and the end wall 32 of this bore functions as a stop shoulder for plate 19. The outer portion of thrust lug 22 is received in spline or keyway 28 for preventing relative arcuate movement between the ring and housing 13. It will be seen from Fig. 4 that thrust lug 21 of plate 18 protrudes radially beyond the periphery of the plate while thrust lug 22 of plate 19 is confined radially within the periphery of ring 19. Ring 19 is retained by turning inwardly the end wall of housing 13 following the installation of the ring as indicated at 33.

The end walls 34 and 35 of transverse slot 29 in housing 13 define the limit of arcuate movement of thrust lug 23 on hub member 14. While under normal load conditions, thrust lug 23 does not operate to these extreme positions, this construction is considered quite important since it does provide a positive drive when such conditions do occur, thus determining the predetermined maximum loading condition of the spring members.

The cylindrical portion of the hub-like member 14 is considerably smaller in diameter than the surrounding interior wall portion of housing 13 whereby to provide an annular space large enough for the free and unhampered expansion of the spring rings 16 and 17, thus allowing these springs to retain a substantially circular shape throughout their range of expansion. Referring to Fig. 3, it will be seen that where the springs are expanded while retaining their circular form the exterior surface 16a will be in uniform compression while the interior surface 16b will be in uniform tension, the neutral axis being the median plane of the spring. The same conditions are similarly present in inner spring 17.

It is important to note in this connection that as a still further assurance of effecting this optimum distribution of stresses in the spring member the end surfaces of the spring members are made to assume a substantially parallel or surface contact relation with the complementary surfaces of the thrust lugs 21, 22 and 23 both in the neutral or aligned positions of these lugs and in the position of maximum displacement.

We have found that this condition of operation is sufficiently realized for all practical purposes when the following factors are observed. The parallel spring actuating surfaces of the lugs must be positioned in a manner such that their planes when extended inwardly, pass on the outside of the central axis, of hub member 14. More specifically we have found that the dimensions indicated $a$ should bear the relation to dimension indicated $b$ in Figure 2 of about one to three.

While we have disclosed a plurality of concentric nested springs 16 and 17 and have found that this arrangement gives particularly good results especially with reference to the distribution of stresses and the consequent long life and wear we nevertheless contemplate as coming within the scope of our invention the use of a single spring member. The important thing to note in this connection is that spring members 16 and 17 are of generally rectangular uniform cross-section throughout, except that the end portions are defined by plane surfaces the extension of which pass on opposite sides of the central axis.

While we have disclosed our invention in connection with a specific embodiment thereof it is to be understood that we contemplate equivalent arrangements as coming within the scope of our invention the same being defined by the appended claims which be given a scope limited only by the prior art.

We claim:

1. In a resilient shaft coupling, a hollow cylindrical housing, a hub-like member received axially within said housing in spaced relation thereto defining an annular space therebetween, an axially split spring steel ring positioned within said annular space, said housing being formed with a peripheral elongated opening in the wall thereof, said hub being provided with a radially outwardly extending thrust lug extending between the spaced adjacent ends of said spring and into said peripheral opening, said housing being provided with thrust lugs for engaging the ends of said spring on each side of said hub thrust lug, said housing thrust lugs being fixed in line with said hub thrust lug when the same is in its neutral position, the extremities of said peripheral elongated opening in said housing functioning as limit stops for limiting the arcuate movement of said hub thrust lug in its two directions of movement relative to said housing thrust lugs.

2. In a resilient shaft coupling, a hollow cylindrical housing open at one end and at least partially closed at the other end thereof, a hub-like member received axially within said housing with the periphery thereof in spaced relation to the inner periphery of said housing thus defining an annular space therebetween, an axially split spring steel ring positioned within said annular space, a thrust lug extending radially from said hub member received between the spaced ends of said split ring, thrust lug means drivingly associated with said housing and extending between the ends of said spring on opposite sides of said hub thrust lug whereby opposite angular movement between said housing thrust lug means and said hub thrust lug is effective to spread the ends of said spring, at least one housing thrust lug being provided by means of a circular plate, the outer periphery of said circular plate being received within the bore of said housing and provided with a coaxially inwardly extending lug, said housing being formed with a keyway for receiving the outer peripheral portion of said lug whereby to prevent the turning of said plate relative to said housing, said lug radially inwardly of said keyway being received between the adjacent spaced ends of said spring.

3. In a resilient shaft coupling, a hollow cylindrical housing open at one end and at least partially closed at the other end thereof, a hub-like member received axially within said housing with the periphery thereof in spaced relation to the inner periphery of said housing thus defining an annular space therebetween, an axially split spring steel ring positioned within said annular space, a thrust lug extending radially from said hub member received between the spaced ends of said split ring, thrust lug means drivingly associated with said housing and extending between the ends of said spring on opposite sides of said hub thrust lug whereby opposite angular movement between said housing thrust lug means and said hub thrust lug is effective to spread the ends of said spring, at least one housing thrust lug being provided by means of a circular plate, the outer periphery of said circular plate being received within the bore of said housing and provided with a coaxially inwardly extending lug, said housing being formed with a keyway for receiving the outer peripheral portion of said lug whereby to prevent the turning of said plate relative to said housing, said lug radially inwardly of said keyway being received between the adjacent spaced ends of said spring, said plate being circularly orificed for reception of said hub member in bearing relation thereto whereby the reaction incident to the opposite relative arcuate movement of said thrust means is effective to cause said hub to bear against said circular orifice in said plate to thus dampen the amplitude of oscillation at resonant frequency.

4. In a resilient shaft coupling, a hollow cylindrical housing open at one end and at least partially closed at the other end thereof, a hub-like member received axially within said housing with the periphery thereof in spaced relation to the inner periphery of said housing thus defining an annular space therebetween, an axially split spring steel ring positioned within said annular space, a thrust lug extending radially from said hub member received between the spaced ends of said split ring, thrust lug means drivingly associated with said housing and extending between the ends of said spring on opposite sides of said hub thrust lug whereby opposite angular movement between said housing thrust lug means and said hub trust lug is effective to spread the ends of said spring, said thrust lug means drivingly associated with said housing comprising a first circular thrust plate received within the bore of said housing adjacent the inner end thereof and formed with an axially extending lug, the inner periphery of said housing being formed with a keyway for reception of a portion of said lug to prevent relative angular movement between said plate and said housing a second portion of said lug being received between the adjacent face ends of said split ring, a second circular thrust plate received in and closing the forward open end of said housing bore and formed with an axially extending thrust lug, the inner periphery of said housing being formed with a keyway in line with said first named keyway for partially receiving said second thrust lug for preventing relative movement between said thrust plate and said housing, said hub thrust lug extending between said thrust plate lug whereby relative arcuate movement between said hub and said housing is effective to load said split ring.

5. The structure defined in claim 2 wherein the forward end of the cylindrical housing is formed with an enlarged bore, a washer-like closure plate received in said bore, the bottom of said enlarged bore functioning as a seat for said plate, the wall of said enlarged bore extending beyond said plate and being turned inwardly for retaining said plate.

EDMUND F. WICHOREK.
JOHN KANUCH.